United States Patent Office.

AMOR SMITH, OF CINCINNATI, OHIO.

*Letters Patent No.* 60,948, *dated January* 1, 1867; *reissue No.* 2,507, *dated March* 12, 1867.

IMPROVED MODE OF PREPARING ANIMAL MATTERS FOR USE AS A FERTILIZER.

The Schedule referred to in these Letters Patent and making part of the same.

TO ALL WHOM IT MAY CONCERN:

Be it known that I, AMOR SMITH, of Cincinnati, in the county of HAMILTON, and State of Ohio, have invented a new and useful Process for Preparing and Preserving the Refuse from the Tanks or Tubs where Animal Matter is Boiled for Use as a Fertilizer for Land; and I do hereby declare that the following is a full, clear, and exact description of the same.

The refuse or offal from the tanks or tubs used in boiling animal matter has heretofore been either lost or so imperfectly prepared by a process of drying as to lose a large part of its real value. In preparing it for use, so that it will not be subject to decomposition, I first collect it from the tanks or tubs, or wheresoever else it may be found, and then press the entire mass of fleshy parts or mixed bones and fleshy parts in a hydraulic or other suitable press. After being thus boiled and then subjected to pressure, it is no longer liable to decomposition, and may be prepared for use as a fertilizer, for which it is valuable.

I do not in this application claim the process for preparing it for use subsequent to its leaving the press, as that will be claimed in another application, but I only claim herein for that part of the process which applies to the mode of preserving the perishable parts from decomposition.

What I now claim as my invention, and desire to secure by Letters Patent, is—

The hereinbefore described process for preserving the perishable parts of animal matter, consisting of the fleshy portions alone, or mixed soft and hard parts, from decomposition by subjecting the same to pressure after being boiled, substantially as and for the purpose set forth.

In testimony whereof I have signed my name to this specification before two subscribing witnesses.

AMOR SMITH.

Witnesses:

JOHN W. CARTER,

AMOR SMITH, Jr.